(12) United States Patent
Bleiker et al.

(10) Patent No.: US 11,588,659 B2
(45) Date of Patent: Feb. 21, 2023

(54) SYSTEM FOR HOME AUTOMATION

(71) Applicant: SMART PLACE AG, Adliswil (CH)

(72) Inventors: David Bleiker, Adliswil (CH); Marco Bleiker, Adliswil (CH)

(73) Assignee: SMART PLACE AG, Adliswil (CH)

( * ) Notice: Subject to any disclaimer, the term of this patent is extended or adjusted under 35 U.S.C. 154(b) by 74 days.

(21) Appl. No.: 16/620,988

(22) PCT Filed: Jun. 8, 2018

(86) PCT No.: PCT/CH2018/000026
§ 371 (c)(1),
(2) Date: Dec. 10, 2019

(87) PCT Pub. No.: WO2018/227312
PCT Pub. Date: Dec. 20, 2018

(65) Prior Publication Data
US 2020/0136852 A1 Apr. 30, 2020

(30) Foreign Application Priority Data

Jun. 12, 2017 (EP) ..................................... 17175460

(51) Int. Cl.
*H04L 12/28* (2006.01)
(52) U.S. Cl.
CPC ...... *H04L 12/2816* (2013.01); *H04L 12/2803* (2013.01)
(58) Field of Classification Search
CPC .................. H04L 12/2803; H04L 12/2816
See application file for complete search history.

(56) References Cited

U.S. PATENT DOCUMENTS 6,957,115 B1 10/2005 Meyer-Graefe et al.
9,772,612 B2* 9/2017 McCarthy, III ........ G05B 15/02
(Continued)

FOREIGN PATENT DOCUMENTS

DE 199 27 635 A1 1/2001

OTHER PUBLICATIONS

International Search Report in PCT/CH2018/000026, dated Nov. 29, 2018.
(Continued)

*Primary Examiner* — Elton Williams
(74) *Attorney, Agent, or Firm* — Collard & Roe, P.C.

(57) ABSTRACT

A system for home automation includes: at least one actuator for controlling at least one lighting device, arrangement including at least one window blind, or heating device; at least one sensor designed as an operable switch or operable system and able to be switched into different modes; a processing unit; a bus-type data transmission device connecting the processing unit to the at least one sensor and the at least one actuator. The sensor includes a measuring device for registering an actual mode of the sensor and a memory for storing sensor mode information. The processing unit includes: memory access for acquiring sensor mode information stored in a memory of the sensor via the bus-type data transmission device; and a control device to transmit an actuator control signal via the bus-type data transmission device, in order to control the at least one actuator in accordance with the sensor mode information.

16 Claims, 4 Drawing Sheets

(56) References Cited

U.S. PATENT DOCUMENTS

2013/0201316 A1* 8/2013 Binder .................... H04L 67/12
                                                            348/77
2015/0355649 A1* 12/2015 Ovadia .................. G10L 17/22
                                                            704/233

OTHER PUBLICATIONS

Website Bihl+Wiedemann—Building Automation, archived on Oct. 25, 2016, which was accessible on Aug. 28, 2017 at the internet address https://web.archive. org/web/20161025105153/http://bihl-wiedemann.de/de/applikationen/gebaeudeautomation.html, downloaded Dec. 6, 2019, 20 pages.

Webserver for temperature measurement dated Oct. 17, 2005, available on the internet at the address https://www.mikrocontroller.net/topic/31408.

Wikipedia encyclopaedia entitled "Programmable Logic Controller", internet address https://de.wikipedia.org/w/index.php, downloaded Dec. 6, 2019, 23 pages.

Hausautomatisierung mit Wago 750—Automation with Wago 750 (Jun. 17, 2015), pp. 1-22, Retrieved from the Internet: https://www.mikrocontroller.net/topic/325144 [retrieved on Sep. 18, 2018] XP055507728 Contributions by: Tom P. (booner), Date: Feb. 25, 2014 16:05 and Feb. 26, 2014 12:03; p. 1-p. 3, downloaded Dec. 6, 2019.

House Bus—Mikrocontroller.net, https://www.mikrocontroller.net/wikisoftware/index.php?title=Hausbus&oldid=96240 [retrieved on Aug. 24, 2017] XP055400912, 8 pages, downloaded Dec. 6, 2019.

Anonymous. "Modbus Application Protocol Specification VI.Ib3" (Apr. 26, 2012), Retrieved from the Internet: http://www.modbus.org/docs/Modbus_Application_Protocol_ VI_Ib3.pdf [retrieved on Sep. 17, 2018] XP055507482, downloaded Dec. 6, 2019, 50 pages.

"Sensor—Wikipedia" (May 5, 2017), Retrieved from the Internet: https://de.wikipedia.org/w/index.php?title=Sensor&oldid=l65229192 [retrieved on Sep. 19, 2018] XP055508189, downloaded Dec. 6, 2019, 5 pages.

Welche SPS für Hausautomatisierung—Mikrocontroller.net—Google Search Dec. 6, 2019 Retrieved from the Internet: https://www.google.com/search? q=hausautomatisierung+sps XP055507147.

"Hausautomatisierung: KNX, SPS, PowerNET" (Feb. 9, 2016), Retrieved from the Internet: https://www.elektriker-und-elektroniker.de/blog/hausautomatisierung-knx-sps-powernet [retrieved on Sep. 14, 2018] XP055507175, downloaded Dec. 6, 2019, 5 pages.

Hausautomatisierung sps—Google Search Sep. 14, 2018, 5 pages.

European Innovation Partnership description of International Standard ISO/IEC 14543, downloaded Dec. 11, 2019, 2 pages.

Euorpean Standard EN 50090, Wikipedia, downloaded Dec. 11, 2019, 3 pages.

KNX Standard, Wikipedia, downloaded Dec. 11, 2019, 6 pages.

* cited by examiner

SYSTEM FOR HOME AUTOMATION

CROSS REFERENCE TO RELATED APPLICATIONS

This application is the National Stage of PCT/CH2018/000026 filed on Jun. 8, 2018, which claims priority under 35 U.S.C. § 119 of European Application No. 17175460.9 filed on Jun. 12, 2017, the disclosure of which is incorporated by reference. The international application under PCT article 21(2) was not published in English.

TECHNICAL FIELD

The invention relates to a system for home automation.

PRIOR ART

"House automation" or "home automation" usually refers to a sub-sector of building automation which is concerned with the particular circumstances found in private homes and the specific needs of their residents, in particular with a view to a convenient use of a residential area, where simple user interfaces for operating the household devices to be controlled are of particular importance.

In the field of building technology systems for home automation are known which are designed to allow automatic open-loop control, closed-loop control and/or monitoring of household devices or an automatic open-loop or closed-loop control and/or monitoring of the household functions. This automation offers the users of a house a high level of convenience. Typical examples of uses of known systems for home automation are, for example:

- automatic operation (switching, control, regulation) of lighting facilities, for example, for the lighting of rooms or an environment of a house;
- automatic operation (switching, control, regulation), of all types of awnings, sun rooves, window blinds, shutters or blackout systems to protect against light;
- automatic operation (switching, control, regulation) of devices for controlling a room temperature and/or a room climate (heating, cooling, ventilation, controlling the humidity);
- control of a door intercom or video intercom system;
- automatic operation (switching, control, regulation) of security facilities, such as an alarm system, a system for monitoring a house (e.g. video surveillance) and/or a system for controlling access by persons to a house or to specific areas in a house or in the vicinity of a house;
- automatic operation (switching, control, regulation) of audio, video or multimedia systems in one or more rooms.

In the field of home automation there are applications in which automated household devices of the above-mentioned kind need to be controlled simply on the basis of parameters which are or can be fixed and do not change with time. For example, it can be provided that a lighting device or heating device or a system for locking doors is switched on or off at specific times. In these applications, it may be appropriate, for example, to equip the automated household device to be switched on or off with a processing unit, or alternatively to connect it to such a unit, which is designed to switch the respective household device on or off at predetermined or predeterminable times.

In the field of home automation, however, there are many examples of more complex applications in which household devices of the above-mentioned kind are to be operated as a function of parameters which can change, for example, unpredictably (randomly) at arbitrary times. One example of such applications is control of a lighting device in a house in such a way that different light sources can be switched on or off at arbitrary times in accordance with the current needs of users, or that light sources can be controlled in order to vary the intensity of the light generated at given times. Another example of such applications is control of a heating device in a house in such a way that a setpoint temperature of a room to be achieved using the heating system can be varied at arbitrary times according to the current needs of the users. In other examples of such applications it can be provided to control a household device according to randomly modifiable parameters whose variation can be recorded with measuring equipment. The latter concerns, for example, the control of awnings, sun rooves, window blinds, shutters or blackout systems depending on the brightness of the available light or a wind speed in the vicinity of a house, or a control of a heating system of a house depending on an outside temperature which will normally vary with time.

In order to operate complex applications of household devices of the above-mentioned kind automatically in the simplest possibly way, systems for home automation have been designed, for example, which can be assembled from different standardized modular components, each of which provide different technical functions allowing various functional aspects of the automation to be implemented largely independently of one another. Such systems for home automation comprise, in particular, sensors and actuators as standardized components.

An "actuator" in this context is to be understood as a device which is designed to control at least one automated household device. A household device which is to be operated under the control of the system for automation must therefore be connected to an actuator, wherein the actuator is designed to provide control signals for controlling the household device.

A "sensor" in this context is to be understood as a device which is enabled to be brought into different states, wherein it is provided to control at least one household device as a function of a current state of the sensor (i.e. of the state into which the sensor is brought at a particular point in time). Examples of a "sensor" are, among others: an operable switch for switching a lighting device on and off, an operable user interface for selecting a specific operating mode from a plurality of operating modes of a household device, or a measuring device for recording at least one parameter (e.g. temperature, brightness, wind speed in the vicinity of a house, presence of a person).

In order to be able to control a household device by means of sensors and actuators of the above-mentioned kind as a function of current states of the sensors, it is necessary to convert the current states of individual sensors into control signals which must be provided by specific actuators for controlling the respective household device. For this purpose, known devices for home automation are designed, for example, in such a way that all actuators and sensors are connected via a bus system which enables a transmission of data (or signals). The bus system allows a communication of information between sensors and actuators (e.g. a transfer of information relating to the current state of the respective sensors and/or the state of the respective actuators).

Devices for home automation which are based on a combination of sensors, actuators and a bus system, are now in use worldwide. Accordingly, in the meantime industry standards have been established which enable standardization of such systems comprising a bus system. In home and building systems technology in accordance with the prior art, for example, a communication between sensors and actuators in accordance with the KNX standard has been established (an open standard according to the European standard EN50090 or the international standard ISO/IEC 14543-3). Here, sensors and actuators are linked by wires or wirelessly "connected" over a "KNX bus", i.e. a bus conforming to the KNX standard, wherein in each case sensors with the appropriate actuators communicate directly with each other. For the purposes of communication, the communicating devices (i.e., a sensor and the corresponding actuator) send mutually defined signals or sequences of signals to each other, which must satisfy a particular communication protocol.

For example, if a sensor (e.g. a light switch for switching a lighting system on or off) detects that a certain actuator should be controlled (e.g., turning on the lights after the light switch is operated by a person), a direct communication of data or signals between the sensor and the corresponding actuator must take place to cause the actuator to execute a desired or predefined action to control a household device.

This direct communication between sensors and actuators leads to a number of problems.

To enable an automatic direct communication between sensors and actuators over a KNX bus, the respective sensors or actuators need to have a high degree of "intelligence", i.e. each sensor and each actuator must usually have a set of electronics, which comprises electronic devices for generating the signals to be sent and for receiving the signals to be received and, in particular, a processor for controlling these electronic devices. The processors of the respective sensors or actuators must ensure, in particular, that the respective signals to be sent correspond to the relevant communication protocol, and carry out an elaborate evaluation of the received signals to allow a sensor to cooperate interactively with an actuator in a reliable manner. For the above reasons, the electronics of the respective sensors and actuators is complex, and the sensors and actuators are therefore expensive.

In order to ensure a reliable transmission of data or signals between sensors and actuators over a KNX bus, the sensors and actuators that communicate with each other must send each other specific sequences of signals in chronological sequence, which requires a bi-directional communication between each of the communicating sensors and actuators. This bidirectional communication is time-consuming and as a result, for example, the data transmission over a KNX bus is relatively slow, i.e. occurs with a relatively low data rate. This is limiting, in particular when a large number of sensors and actuators are connected over a KNX bus. In particular, critical situations can arise if a large number of sensors are caused to launch a bidirectional communication of data with a similarly large number of actuators over a (single, i.e. the same) KNX bus, essentially at the same time. In this case, conflicts between a communication of one sensor with a specific actuator and a communication of other sensors with other actuators are inevitable. Such conflicts can lead to an unstable operation of a home automation system based on a KNX bus and thus adversely affect the functionality of this system.

An unstable operation of a home automation system based on a KNX bus can also be caused by various forms of electrical interference (e.g. from electromagnetic fields generated by high-voltage power lines, electromagnetic waves), especially since such interference can affect the transmission of data over the bus. A sensor of such a system is usually designed in such a way that the sensor communicates a change of its state in a single operation to an actuator associated with the sensor, by the sensor transmitting data to the associated sensor once via the KNX bus, which contains information relating to the change of state of the sensor. If in this case electrical interference acts upon the KNX bus during the transmission of the data, there is a risk that the associated actuator may not receive the transmitted information correctly or only incompletely, or in some cases, cannot receive any data at all. Due to the interference it therefore cannot be guaranteed that the actuator is able to respond to the data transmitted by the sensor in a predetermined way. In particular, there is a danger that due to the interference the actuator does not control a household device in a manner corresponding to the data transmitted, or under certain circumstances does not activate it at all. This will have a negative effect on the functionality of the system for automation.

In addition, in an installation of a home automation system based on a KNX bus, before an initial installation of the system it will usually be necessary to configure or program separately all sensors and actuators which are intended to communicate via the KNX bus, to ensure that each sensor can communicate with a particular actuator associated with this sensor in a predetermined way. The implementation of the configuration or programming of all of the individual sensors and actuators before the initial installation is time-consuming and demanding for the personnel involved in the installation. The effort is greater, the greater the number of sensors and actuators.

As alternatives to a KNX bus other bus systems (e.g. DALI, AMX, TCP/IP) are known, which are designed such that a bi-directional communication between sensors and actuators must take place automatically over the corresponding bus system. In order to allow this communication, the sensors and actuators in these bus systems must also be provided with complex electronics having a high degree of "intelligence". The above-mentioned bus systems therefore also lead to the disadvantages, which were identified above in connection with a home automation system based on a KNX bus.

A "Website Bihl+Wiedemann—Building Automation", archived on 25 Oct. 2016, which was accessible on 28 Aug. 2017 at the internet address https://web.archive.org/web/20161025105153/http://bihl-wiedemann.de/de/applikationen/gebaeudeautomation.html, discloses an application of a standardized industrial wiring system known under the name "AS-Interface" (or "Actuator Sensor Interface" or "AS-i") to automation in the field of building automation. This wiring system enables connectivity of actuators and sensors by means of a bus ("AS-i bus") according to a master/slave principle. For this purpose, a so-called master module ("AS-i master") can be connected via an AS-i bus to a plurality of so-called slave-modules ("AS-i slaves"). The AS-i master module is used for controlling all of the devices connected to the AS-i bus and for this purpose acts as a direct interface to a higher-level controller (DDC, GLT, PLC, etc.), or in combination with an integrated programmable logic controller (Small-PLC) it can also be used for pre-processing or independently as a "stand-alone device" without a higher-level controller. All AS-i slave-modules can be connected using a single two-core round or flat cable (AS-i cable) to the AS-i master module with free choice over the topology used. Via the same AS-i cable, data and energy are transferred, wherein each AS-i slave module has its own address for access to its data. For an application in the field of building automation, AS-i slave modules, in particular ones which can be connected to the AS-i bus, are available which allow a control of ventilation flaps via digital outputs or control of fire/smoke dampers or heating/cooling ceilings via analogue outputs. For integration of sensors, AS-i slave modules which are compatible with the AS-i bus are available, said AS-i slave modules being designed as digital input/output modules (I/O modules) and having, for example, inputs for connecting sensors. For the integration of wireless buttons and wireless sensors, AS-i slave modules that are compatible with the AS-i bus are available which are designed to receive radio signals emitted by wireless buttons or wireless sensors via a corresponding radio interface ("EnOcean Gateway"). In order to be able to switch lighting devices on or off, for example, "standard switches" are available, which are designed as conventional electro-mechanical light switches. Such "standard switches" are, as a rule, passive components, which cannot be directly connected to an AS-i bus for potential use in combination with an AS-i bus. To enable the connection of "standard switches" to an AS-i bus, an AS-i slave module is known, for example, which can be connected directly to an AS-i bus and has four inputs to which "standard switches" can be connected. The installation and startup of a system for home automation with such "standard switches" is relatively complicated, since an AS-i slave module of the above-mentioned type has to be connected to an AS-i bus and in addition, the "standard switches" must be individually connected via electrical cables to the respective inputs of the AS-i slave module. This results in considerable effort, for example because during the installation of the "standard switches", among other tasks, it needs to be verified which "standard switch" was connected to which of the inputs of the AS-i slave module.

A publication "Webserver for temperature measurement" dated 17 Oct. 2005, available on the internet at the address https://www.mikrocontroller.net/topic/31408, discloses a use of a web server for temperature measurement, in which a temperature sensor is connected via a "1-wire bus" (also known as "one-wire bus") to a web server.

The unexamined application DE 19927635 A1 discloses an automation system which comprises a bus system, connected bus subscribers with associated sensors and actuators, and a standard control device, wherein the standard control device carries out the process control with the processing of process-related input/output data (I/O data) and a safety-relevant control with the processing of safety-relevant data, i.e. the control of safety-related inputs and outputs. For the process control the standard control device receives data from the individual bus subscribers, which in turn themselves receive data from the standard control device. In addition, the standard control device is designed to process safety-relevant data and for this purpose, to also assume the processing of the safety-relevant inputs and outputs. For example, the speed sensor of a rotary machine, which is connected to the bus via one of the bus subscribers, is one such safety-relevant input as the rotary machine must not rotate faster than a given limit. Another example of a safety-relevant input in the described embodiment is a photo-detector of a light barrier with which the working area of the rotary machine is monitored. For example, the standard control device can issue a shutdown command for the above-mentioned rotary machine via the bus to the associated bus subscriber if the maximum speed has been exceeded, indicating that there is a danger that the system might get out of control. The bus can be a system that operates according to the master-slave principle, in which the standard control device acts as the master and the individual bus subscribers act as slaves.

An article in the Wikipedia encyclopaedia accessible on 31 May 2017 entitled "Programmable Logic Controller", which was accessed on 28 Aug. 2017 at the internet address https://de.wikipedia.org/w/index.php?title=SpeicherProgrammierbare_Steuerung&oldid=165967031#SPS-Zust.C3.A4nde, discloses a device designated as a "programmable logic controller" (PLC), which is used for the open-loop or closed-loop control of a machine or system and is programmed by digital means. A PLC, in the simplest case, has inputs, outputs, an operating system (firmware) and an interface through which a user program can be loaded. The user program specifies how the outputs should be switched depending on the inputs. The connection of the PLC to the machine or system is carried out with sensors and actuators. In addition, status indicators are provided. The sensors are connected to the inputs of the PLC and inform the PLC of what is happening in the machine or system. Examples of sensors are e.g. buttons, light barriers, incremental encoders, limit switches, or temperature sensors, liquid level sensors etc. The actuators are connected to the outputs of the PLC, offering the facility to control the machine or system. Examples of actuators are contactors for switching on electric motors, electric valves for hydraulics or compressed air, but also modules for drive controllers (motion control, speed control with controlled acceleration or deceleration, stepper motor controllers).

SUMMARY OF INVENTION

The problem addressed by the present invention is to avoid the above disadvantages and, in particular, to create a device for home automation which enables a simplified, more cost-effective implementation of connecting sensors and actuators on the basis of a bus system for controlling a household device, having a lighting device, an arrangement of at least one blind and/or a heating system for heating at least one room.

This object is achieved by means of a system for home automation having the features of claim 1.

This system for home automation comprises at least one actuator for controlling at least one household device; at least one sensor which can be brought into different states, wherein the different states comprise at least a first state and a second state; a measuring device for registering a current state of the sensor; a memory for storing sensor state information following a registration of a current state of the sensor by means of the measuring device, which sensor state information corresponds to the current state of the sensor registered by the measuring device; a processing unit and a bus-type data transmission device via which the processing unit is connected to the at least one sensor and the at least one actuator, the bus-type data transmission device comprising at least one bus. The processing unit of the system comprises a control device which is designed to transmit an actuator control signal to the at least one actuator via the bus-type data transmission device for activating the at least one actuator to control the at least one household device.

The processing unit further comprises memory access means designed to perform access to the memory via the bus-type data transmission device, so that sensor state information stored in the memory is enabled to be recorded by the processing unit.

In addition, the control device of the processing unit is designed to control the at least one actuator as a function of sensor state information recorded by the processing unit, in such a way that the control device transmits a first actuator control signal via the bus-type data transmission device to the at least one actuator if the sensor state information recorded by the processing unit corresponds to the first state of the at least one sensor, and transmits either no actuator control signal or a second actuator control signal, different from the first actuator control signal, via the bus-type data transmission device to the at least one actuator if the sensor state information recorded by the processing unit corresponds to the second state of the at least one sensor.

In this case the at least one household device and the at least one sensor are designed in accordance with one of the following alternatives (a)-(c):

(a) the at least one household device is a lighting device and the at least one sensor is designed as an operable switch, which is enabled to be brought into different states to switch at least one light source of the lighting device on or off or control it with regard to the brightness of the light generated by means of the light source;

(b) the at least one household device is an arrangement of at least one window blind and the at least one sensor is designed as an operable device, which is enabled to be brought into different states which define setpoint positions of the at least one window blind;

(c) the at least one household device is a heating device for heating at least one room and the at least one sensor is designed as an operable device which is enabled to be brought into different states, which define setpoint temperatures to be achieved in the at least one room by means of the heating device.

According to the invention the at least one sensor comprises the measuring device and the memory and is designed to store the sensor state information, which corresponds to the current state of the at least one sensor registered by the measuring device, in the memory, and the processing unit is connected to the at least one sensor via the at least one bus, wherein the at least one bus is designed to enable a wired transmission of data or signals between the processing unit and the at least one sensor.

In this context, the term "bus-type data transmission device" means a device which comprises at least one bus suitable for a transmission of data or corresponding signals.

Because the system for automation has a bus-type data transmission device via which the processing unit is connected to the at least one sensor and the at least one actuator, a transmission of data or corresponding signals via at least one bus is therefore provided. In regard to an "interaction" between the at least one sensor and the at least one actuator, the processing unit has a central function in the context of the invention. In order to activate the at least one actuator to control a household device associated with this actuator, the control device of the processing unit must send a corresponding control signal—in this case referred to "actuator control signal"—via the bus-type data transmission device to the at least one actuator. This activation of the at least one actuator therefore takes place under the control of the processing unit.

To enable an activation of the at least one actuator depending on various states of the at least one sensor, the at least one sensor comprises a measuring device which registers a current state of the sensor (i.e. the state, into which the sensor is brought at a particular point in time), and a memory in which—after a current state of the sensor has been registered by the measuring device—a sensor state information is stored which characterizes the current state of the sensor registered by the measuring device. The memory of the sensor thus contains information relating to which of the various possible states into which the sensor can be brought it has in fact been brought into (at the time at which the current state of the sensor was registered by the measuring device).

To enable a household device in the form of a lighting device, an arrangement of at least one window blind or a heating system, to be operated in the sense of the above-mentioned alternatives (a)-(c), the at least one sensor of the present system for home automation is designed as an "operable switch" or "operable device" in the sense of the alternatives (a)-(c). The fact that the at least one sensor is not only designed as an "operable switch" or "operable device" sensor, but (as part of the sensor) also comprises a measuring device for registering a current state of the sensor and a memory for storing sensor state information which corresponds to the current state of the sensor registered by the measuring device, provides a prerequisite for the fact that the at least one sensor forms a single unit which is configured to be connected as a whole "directly" to the at least one bus of the bus-type data transmission device, i.e. for connecting the sensor to the at least one bus it is not necessary to implement an additional module to be arranged between the sensor and the at least one bus, which would itself need to be connected directly to the at least one bus and would additionally need to have an interface via which the sensor could be connected to the additional module. Since also the processing unit is connected to the at least one sensor via the at least one bus and the at least one bus is designed to enable a wired transmission of data or signals between the processing unit and the at least one sensor, the at least one bus forms a direct connection between the processing unit and the at least one sensor, which allows the processing unit to record sensor state information stored in the memory of the at least one sensor. Since the at least one sensor only needs to be directly connected to the at least one bus of the bus-type data transmission device, the system according to the invention for home automation has the advantage that when installing the system in a house and during an initial startup of the system, in particular, the implementation of the at least one sensor can be carried out relatively easily (without complications which could give rise to errors in the implementation) and with relatively little effort. This advantage is particularly evident when the system for home automation comprises a plurality of such sensors and all of these sensors must be connected to the at least one bus.

In this case the at least one household device can be a lighting device with a light source or a plurality of light sources for lighting one or multiple rooms or room areas. In this case, the at least one sensor can be designed as an operable switch, which by an operation by a user can be brought into different states in order to switch at least one light source of a lighting device on or off or control it with regard to the brightness of the light produced by the light source, or to switch multiple light sources of a lighting device on or off independently of each other or to control them with regard to the brightness of the light generated by the light sources. Alternatively, the at least one household device can be an arrangement of one or more window blinds for a window and/or a door, or for a plurality of windows and/or doors. In this case, the at least one sensor can be designed as an operable device which by operation by a user can be brought into different states to define specific setpoint positions for the arrangement of one or more window blinds, which the one window blind is to occupy or the individual blinds are to occupy. In a further alternative, the at least one household device can be a heating system for heating one or more rooms in a house. In this case, the at least one sensor can be designed as an operable device, which can be brought into various states by an operation by a user in order to define different target temperatures for the heating system, which are to be achieved in the room or the individual rooms.

However, it is not provided that the at least one sensor must itself become active after registering a current state of the sensor in order to transfer information about the registered state of the sensor over the bus-type data transmission device to the at least one actuator. The fact that the processing unit has memory access means designed to perform access to the memory of the at least one sensor over the bus-type data transmission device ensures that the processing unit is configured to record the sensor state information stored in the memory of the sensor via the bus-type data transmission device, in particular at a time which can be specified by the processing unit. The fact that the control device of the processing unit is designed to control the at least one actuator as a function of sensor status information recorded by the processing unit means that the processing unit has the function, on the basis of the sensor state information stored in the memory of the at least one sensor, to initiate, if appropriate, an activation of the at least one actuator (if necessary by sending an appropriate actuator control signal from the control device of the processing unit to the at least one actuator via the bus-type data transmission device).

The fact that the control device of the processing unit is configured to control the at least one actuator "as a function of sensor state information recorded by the processing unit" is expressed here by providing that the at least one sensor is configured to be brought into at least two specific, different states—for example, a first state or a second state, wherein the control unit, depending on whether the at least one sensor is in one of the two specified states or in the other of the two specified states—reacts in different ways: the control device transmits a first actuator control signal via the bus-type data transmission device to the at least one actuator if the sensor state information recorded by the processing unit corresponds to the first state of the at least one sensor; alternatively, the control device transmits to the at least one actuator either no actuator control signal or a second actuator control signal, different from the first actuator control signal, if the sensor status information recorded by the processing unit corresponds to the second state of the at least one sensor. The particular response of the control device of the processing unit (sending a first actuator control signal and alternatively, not sending an actuator control signal or sending a second actuator control signal, different from the first actuator control signal) is therefore correlated with different states which the sensor can currently occupy. Accordingly, the particular activation of the at least one actuator (receiving the first actuator control signal and alternatively, receiving no actuator control signal or a second actuator control signal, different from the first actuator control signal) is correlated with different states which the sensor can currently occupy.

This design of the system for home automation has the advantage that the at least one sensor and the at least one actuator do not need to be designed to automatically perform a direct (bi-directional) communication of data between the sensor and the actuator. Neither the sensor nor the actuator therefore needs to be equipped with electronics having a high degree of "intelligence", which—as mentioned above—would be required to allow sensors and actuators to perform an automatic and direct (bi-directional) communication over a KNX bus or another type of bus based on another "intelligent" bus technology.

In other words: in the case of the system according to the invention for home automation, each sensor and each actuator can be equipped with a relatively simple and hence low-cost electronics. On the other hand, the processing unit performs the role of a "central intelligence", which defines the temporal behaviour of a conversion of a registered current state of the at least one sensor into a corresponding activation of the at least one actuator for activating the actuator.

The memory of the at least one sensor does not necessarily need to be suitable for storing data in a non-volatile manner. Alternatively, the memory of the at least one sensor can be implemented as a non-volatile data memory. If the memory of the sensor is a non-volatile data memory, this may be especially advantageous if the power supply to the sensor should fail. If the memory of the sensor is a non-volatile data memory, in the event of a power supply failure the sensor state information which corresponds to the current state of the sensor, which was last registered by the sensor before the failure of the power supply of the measuring device, remains stored in the memory of the sensor even after failure of the power supply. In this way, the information about the state into which the sensor was brought before the failure of the power supply is retained in the memory of the sensor. After the power supply has been restored the system for home automation is therefore able to continue its operation on the basis of the sensor state information which was stored in memory prior to the power failure. This makes the system for home automation relatively insensitive to faults due to a failure of the power supply.

In one embodiment of the system for home automation the processing unit comprises an evaluation device which is designed to carry out an evaluation of sensor state information recorded by the processing unit, and as a result of the evaluation to determine according to predefined rules whether the at least one actuator should be activated to control the at least one household device, and, if the result of the evaluation is that the at least one actuator should be activated to control the at least one household device, to cause the control device to transmit a corresponding actuator control signal via the bus-type data transmission device to the at least one actuator. An "evaluation of sensor state information recorded by the processing unit" by means of the evaluation device can include in this context, in particular, the fact that the processing device is designed, from the sensor state information recorded by the processing unit, to determine in which state (of several possible, different states, into which at least one sensor can bebrought) the at least one sensor is currently present. It can also be provided that the at least one actuator should be activated with a specific actuator control signal when the at least one sensor is brought into a predefined state or in one of a plurality of predefined states. In this respect, one or more characteristic parameters can be implemented in the evaluation device, which specify the particular actuator control signal with which the at least one actuator should be activated when the at least one sensor is brought into a predefined state or in one of a plurality of predefined states. The evaluation of "sensor state information recorded by the processing unit" in this case can comprise determining the one or more characteristic parameters which specify the actuator control signal with which the at least one actuator should be activated when the at least one sensor is brought into a state which corresponds to the sensor status information recorded by the processing unit. The evaluation device can also be designed to provide all the characteristic parameters that specify a particular actuator control signal to the control device, so that the control device is enabled to generate a corresponding actuator control signal and transfer it via the bus-type data transmission device to the at least one actuator.

It should be noted that the evaluation device can be an integral part of the control device. Alternatively, the evaluation device can also be arranged separately from the control device.

In one embodiment of the system for home automation the memory access means are controllable to carry out the access to the memory of the at least one sensor repeatedly at a plurality of consecutive times, so that the processing unit is designed to record, after each access to the memory access means, the particular sensor state information stored in the memory of the at least one sensor. The control device is also designed to control, after each access to the memory access means, the at least one actuator as a function of the sensor state information recorded by the processing unit.

If in the course of time the at least one sensor is brought from one state into another state, then the result is that the measuring device of the sensor detects this change, with the result that a (modified) sensor state information is stored in the memory of the sensor after the detection of the change. Due to the fact that the access to the memory of the at least one sensor is carried out repeatedly at a plurality of consecutive times, the processing unit is able to record the current state of the sensor as a function of time and thus to detect changes in the state of the sensor by repeatedly accessing the memory of the at least one sensor. The processing unit is thus able, after each access to the memory, to activate the at least one actuator with an actuator control signal, which corresponds to the particular sensor state information recorded by the processing unit.

For example, the processing unit can comprise an evaluation device which is designed to carry out an evaluation of sensor state information recorded by the processing unit after each access by the memory access means, and as a result of the evaluation to determine according to predefined rules whether the at least one actuator should be activated to control the at least one household device, and, if the result of the evaluation is that the at least one actuator should be activated to control the at least one household device, to cause the control device to transmit a corresponding actuator control signal via the bus-type data transmission device to the at least one actuator. Because the evaluation device carries out an evaluation of the sensor status information recorded by the processing unit after each accessing of the memory access means, the processing unit is able to verify after each access to the memory whether an activation of the at least one actuator is required, and if so, to initiate a transmission of a corresponding actuator control signal. This allows activation of the at least one actuator to control a household device according to the current state into which the at least one sensor is brought at that moment.

The choice of the consecutive times at which the access to the memory of the at least one sensor should be repeated depends on how often it is expected that the at least one sensor might be moved into a different state, and how quickly the at least one actuator might have to be activated to control a household device after the sensor has been brought into a different state. In regard to typical requirements in the field of home automation it is usually sufficient to monitor the current state of the at least one sensor repeatedly at regular intervals of, for example, 0.1 seconds (corresponding to a refresh rate of 10 Hz). It is therefore appropriate to repeatedly access the memory of the at least one sensor and to record and analyse the sensor state information stored in memory in each case at regular intervals of, for example, 0.1 seconds.

A recording of the sensor status information currently stored in memory either continuously or repeated at regular intervals and an activation of the actuator with the corresponding actuator control signals carried out at regular intervals also solves the problems due to the susceptibility to electrical interferences which affect the functionality of devices for home automation in accordance with the prior art.

If in the case of the above-mentioned embodiment of the home automation system a time-limited (for example, electrical) interference were to occur after accessing the memory of the at least one sensor, which causes the processing unit to record the sensor state information stored in the memory of the sensor only incompletely or incorrectly or not at all, then such an interference is not problematic. This is because in the above-mentioned embodiment of the system for home automation the access to the memory of the sensor is continually repeated (for example, at intervals of 0.1 seconds), the processing unit is able to record the sensor state information stored in the memory of the sensor correctly, immediately after the interference has come to an end.

Since the control device is also designed to transfer an actuator control signal corresponding to the recorded sensor state information to the actuator after each recording of an item of sensor state information stored in the memory of the sensor, it is guaranteed that the actuator is supplied with actuator control signals continuously or repeatedly at regular time intervals (for example, intervals of 0.1 seconds). If a time-limited interference were to occur during a transmission of the actuator control signals via the bus-type data transmission device, as a result of which the actuator can only receive the transmitted actuator control signals incompletely or incorrectly or not at all while the interference is present, such an interference is also unproblematic. Because in the above-mentioned embodiment of the system for home automation the transmission of the actuator control signals is constantly repeated (for example, at intervals of 0.1 seconds), the actuator is able to receive the transmitted actuator control signals correctly immediately after the interference has come to an end.

This ensures that in spite of the occurrence of interferences the actuator can still receive actuator control signals which correspond to the current state of the at least one sensor. The above embodiment of the system for home automation is therefore advantageously insensitive to time-limited interferences.

In another embodiment of the system for home automation a plurality of sensors is present and each of the sensors is configured to be brought into different states, the different states of each sensor comprising at least a first state and a second state. Furthermore, each of the sensors comprises a measuring device for registering a current state of the sensor, and a memory and is designed, after a current state of the sensor has been registered using the measuring device of the sensor, to store in the memory an item of sensor state information which corresponds to the current state of the sensor registered by the measuring device. Each of the sensors is connected to the processing unit via the bus-type data transmission device and the memory access means are designed to carry out access to the memory of any of the sensors over the bus-type data transmission device so that any sensor state information, which is stored in the memory of each of the sensors, can be recorded by the processing unit. In this way, when a plurality of sensors is present, by using the memory access means the processing unit is able to query the current status of each sensor by accessing the memory of the respective sensor. In particular, the access means can in particular be controlled in such a way that the accesses to the memories of the various sensors take place consecutively. The sensors do not require any complex electronics with a high degree of "intelligence" to enable accesses to the memories of the individual sensors. The processing unit is therefore in a position to record all sensor status information stored in the memories of all sensors with a high data rate over the bus-type data transmission device. Accordingly, the processing unit is in a position to record the current sensor state information for a large number of sensors in a relatively short time.

In a further development of the above-mentioned embodiment of the system for home automation comprising a plurality of sensors, the memory access means are configured to be controlled to carry out the access to the memory of each of the sensors repeatedly at consecutive times, and each item of sensor state information which is stored in the memory of each of the sensors can be recorded by the processing unit after every access to the memory. Due to the fact that the access to the memory of each individual sensor is performed repeatedly, the processing unit is in a position to record the current state of each individual sensor as a function of time, and thus to determine whether the current state of a sensor is changing with time. In regard to typical requirements in the field of home automation it is usually sufficient to monitor the current state of each individual one of the sensors repeatedly at regular intervals of, for example, 0.1 seconds. It is therefore appropriate to repeatedly access the memory of each individual one of the sensors and to record and analyse the sensor state information stored in the memory in each case at regular intervals of, for example, 0.1 seconds.

Another embodiment of the system for home automation has a plurality of actuators, wherein the processing unit is connected to each of the actuators via the bus-type data transmission device. In this way, a plurality of different household devices can be operated using a plurality of actuators. Of course, the various actuators can be designed differently and have different functions.

A variant of the embodiment of the system for home automation which has a plurality of sensors and a plurality of actuators is designed such that each of the sensors is assigned at least one of the actuators and the processing unit comprises an implementation of a sensor-actuator mapping, which contains information for each of the sensors about which of the actuators is assigned to the sensor. The control device of the processing unit is also designed to control at least one actuator, which is assigned to one of the sensors, as a function of sensor state information recorded by the processing unit, in such a way that the control device transmits a first actuator control signal via the bus-type data transmission device to the at least one actuator, which is assigned to the one of the sensors, if the sensor state information recorded by the processing unit corresponds to the first state of the one of the sensors, and transmits either no actuator control signal or a second actuator control signal being different from the first actuator control signal via the bus-type data transmission device to the at least one actuator if the sensor state information recorded by the processing unit corresponds to the second state of the one of the sensors.

The fact that the processing unit comprises the implementation of a sensor-actuator mapping ensures that the processing unit has access to information about which sensor, or which current state of a sensor, is relevant to an activation of a particular actuator. Therefore, none of the sensors itself needs to have information about which of the actuators is assigned to the respective sensor, or which of the actuators might need to be activated depending on a current state of the respective sensor. This is another reason why the sensors themselves do not require a complex set of electronics with a high degree of "intelligence".

For example, the processing unit can comprise an evaluation device which is designed, after recording sensor state information stored in the memory of the sensor, to carry out an evaluation of the recorded sensor state information for each of the individual sensors and as a result of the evaluation to determine according to predefined rules whether the at least one actuator, which is assigned to the respective sensor according to the sensor-actuator mapping, should be activated to control the at least one household device and if the result of the evaluation is that the at least one actuator which is assigned to the sensor according to the sensor-actuator mapping should be activated to control the at least one household device, to cause the control device to transmit a corresponding actuator control signal via the bus-type data transmission device to the at least one actuator which is assigned to the sensor according to the sensor-actuator mapping.

Further developments of the above-mentioned embodiments are characterized in that the processing unit comprises a data memory, in which an item of sensor status information recorded by the processing unit can be stored. In this way, the sensor state information of all sensors can be stored in the data memory of the processing unit. The data memory of the processing unit is preferably a non-volatile data memory. This is of particular advantage if the power supply of the sensor or the processing unit should fail. In the event of a power supply failure the sensor state information which correspond to the current states of the sensors that were the last to be registered before the failure of the power supply, remain stored in the data memory of the processing device even after the failure of the power supply. This makes the system for home automation relatively insensitive to faults due to a failure of the power supply.

Further developments of the above-mentioned embodiments are characterized in that the bus-type data transmission device comprises a first bus and a second bus separate from the first bus, wherein the processing unit is connected to each individual sensor via the first bus and the processing unit is connected to each individual actuator via the second bus. This ensures that the processing unit is configured to record the sensor status information exclusively via the first bus and actuator control signals to activate the actuators are enabled to be transmitted exclusively via the second bus. In this way it is possible to carry out the processes of recording the sensor state information and transferring the actuator control signals essentially simultaneously (as parallel processes). Furthermore, the actuator control signals transmitted via the second bus cannot interfere with the recording of the sensor state information, which takes place via the first bus. This enables a recording of the sensor state information for all sensors and a simultaneous transmission of actuator control signals to the actuators at particularly high data rates.

Further developments of the above-mentioned embodiments are characterized in that each sensor is assigned an address information which uniquely identifies each sensor, and each sensor comprises an address information storage element, which contains the address information assigned to the sensor.

The above-mentioned further developments can be configured in such a way that the processing unit comprises a data memory in which address data are stored for each sensor, which contain the address information assigned to the sensor. This data memory is preferably a non-volatile memory, so that after the automation system is started up the address data are available permanently, and retained even in the event of a failure of the power supply to the processing unit.

Another variant of the above-mentioned further developments is characterized in that each sensor can be controlled by the processing unit by means of a sensor control signal, which sensor control signal contains the address information assigned to the sensor and control information for controlling the sensor, and can be generated by means of the memory access means of the processing unit and transferred by means of the bus-type data transmission device to any sensor which is connected to the processing unit via the bus-type data transmission device.

The above-mentioned measures allow the processing unit to selectively control a specific sensor using a sensor control signal which is transmitted over the bus-type data transmission device and contains the address information assigned to the specific sensor. The respective sensor control signal reaches all sensors via the bus-type data transmission, which are connected to the bus-type data transmission device.

A further development of the above-mentioned variant is configured in such a way that each sensor has a bus coupling device, which is designed to receive a sensor control signal transmitted by means of the bus-type data transmission device and to initiate control of the sensor if the address information included in the received sensor control signal is identical to the address information which is assigned to the sensor, wherein the bus coupling device is designed to initiate the control of the sensor according to the sensor control information contained in the received sensor control signal. The bus coupling device of a sensor allows the respective sensor to react selectively to sensor control signals transmitted using the bus-type data transmission device. An appropriate response of a sensor to the control information contained in a sensor control signal is only possible if the address information contained in the received sensor control signal is identical to the address information which is assigned to the sensor. On this basis, the processing unit is in a position to control a specific sensor selectively and to cause it to issue a predetermined response (using the address information contained in the sensor control signal).

A further development of the above-mentioned variant is configured in such a way that the bus coupling device of a sensor is connected to the memory of the sensor, and the memory of the sensor is configured to be controlled as a function of the sensor control signal that is received. On this basis, the processing unit is in a position to control the memory of a specific sensor selectively and to cause it to issue a predetermined response (using the address information contained in the sensor control signal). The memory of the respective sensor is configured to be used to induce different responses (depending on the control information contained in a sensor control signal). For example, the memory of the respective sensor is configured to be controlled to store specific data transmitted over the bus-type data transmission device (an example of which is described in the following). Alternatively, the memory of the respective sensor can be controlled to make information or data stored in the memory (for example, stored sensor state information) accessible to the memory access means via the bus-type data transmission device.

The memory of the sensor is preferably configured to be controlled as a function of the received sensor control signal to provide a signal which contains an encoding of the sensor state information stored in the memory of the sensor. The memory access means of the processing unit are also preferably designed to detect the signal provided by the memory via the bus-type data transmission device and to determine the sensor state information from the encoding contained in the signal.

A further development of the above-mentioned variant is designed in such a way that at least one sensor is configurable to enable an operation of the sensor in different configurations depending on predeterminable configuration data. In this case a first configuration of the at least one sensor after an initial installation of the sensor is enabled to be initiated by the processing unit using a sensor control signal transmitted via the bus-type data transmission device, the control information of which signal contains the configuration data which are designated for the initial configuration. The configuration data contained in the sensor control signal can be stored in the memory of the at least one sensor.

Preferably, the predeterminable configuration data and/or the configuration data designated for the first configuration are stored in a (preferably non-volatile) data memory of the processing unit.

Another embodiment of the system for home automation is designed in such a way that at least one actuator control signal transmitted to at least one actuator contains control information for controlling the at least one actuator and the processing unit comprises a data memory in which the control information contained in the actuator control signal can be stored.

The data memory of the processing unit is preferably a non-volatile data memory. In the event of a power supply failure, the control information contained in the respective actuator control signals, which were the last to be sent to the respective actuators before the failure of the power supply, remain in the data memory of the processing unit even after the failure of the power supply. Even after failure of the power supply therefore, information is available as to how the individual household devices were last controlled by the respective actuators before failure of the power supply. This makes the system for home automation relatively insensitive to faults due to a failure of the power supply.

BRIEF DESCRIPTION OF DRAWINGS

Additional details of the invention and, in particular, exemplary embodiments of the system according to the invention are described in the following by reference to the attached drawings. It is shown in.

DESCRIPTION OF THE EMBODIMENTS

Figure 1:
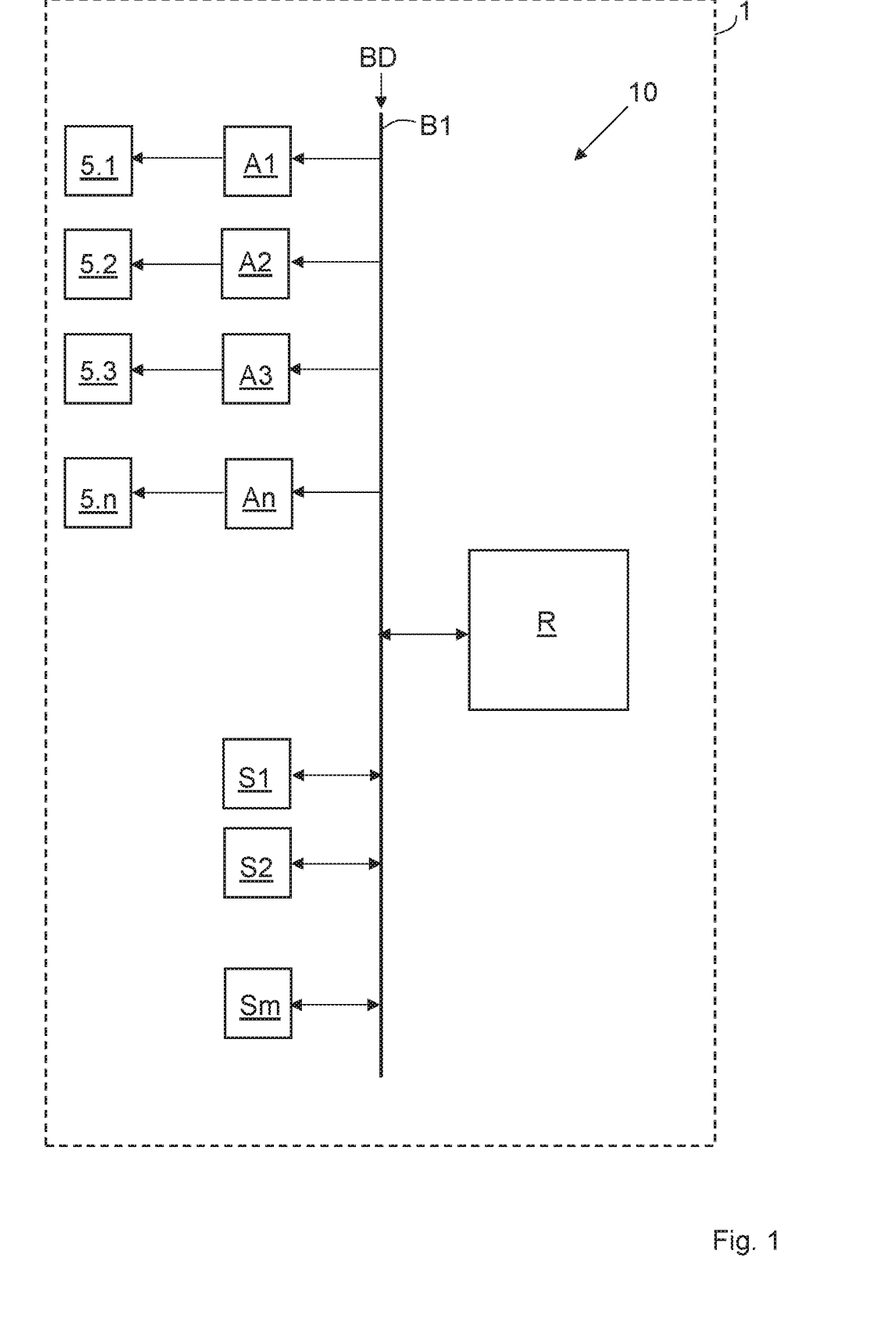
FIG. 1 a first embodiment of a system for home automation in accordance with the invention, having a plurality of sensors, a plurality of actuators and a processing unit in combination with a bus-type data transmission device.

FIG. 1 shows a system 10 for home automation in accordance with the invention in a first embodiment. The home 1 is indicated purely schematically in FIG. 1 by means of a dotted line representing a rectangle (the arrangement of the rectangle according to FIG. 1 is not to be understood to indicate how the system 10 should be physically arranged relative to a home).

As FIG. 1 suggests, the system 10 in this example is configured to operate n different household devices automatically (where "n" is any natural number) in a home or in the vicinity of a home. In FIG. 1 (without restriction of generality) a total of four of the household devices are indicated, which are labelled with 5.1, 5.2, 5.3 and 5.n, where n>4 is assumed. The specific technical features that the devices 5.1, 5.2, 5.3 and 5.n shown have are not relevant in this context. The device 5.1 can be, for example, a lighting device with one or more light sources for the illumination of one or more rooms or room areas. The device 5.2 can be, for example, an arrangement of one or more blinds for a window and/or a door, or for a plurality of windows and/or doors. The device 5.3 can represent, for example, a heating system with one or more heat sources for heating one or more rooms in a home. The device 5.n can represent, for example, a system for monitoring premises in a home.

The system 10 comprises: a plurality of actuators, of which four actuators A1, A2, A3 and An are shown in FIG. 1; a total of m sensors, of which three sensors S1, S2, Sm are shown in FIG. 1, where m denotes any natural number with m>3; a processing unit R; a bus-type data transmission device BD, over which the processing unit R is connected to all actuators A1-An and all sensors S1-Sm.

In this example each one of the household devices is assigned to one of the actuators, so that each of the actuators is designed to control one of the household devices. In accordance with FIG. 1 the actuators A1, A2, A3 and An are provided, for example, to activate the devices 5.1, 5.2, 5.3 and 5.n (in this order).

In this example it is assumed that each of the sensors S1-Sm can be brought into different states and has a measuring device (not shown in FIG. 1 and described below in connection with FIGS. 3 and 4) for registering a current state of the respective sensor.

The specific technical features that the sensors S1, S2, Sm shown in FIG. 1 have is not relevant in this context. The sensor S1 can be operated, for example, as an operable switch which is configured to be brought into different states to switch at least one light source of a lighting device (e.g. device 5.1) on or off or to regulate it with regard to the brightness of the light produced by the light source, or to switch multiple light sources of a lighting device (for example, device 5.1) on or off independently of each other or to regulate them with regard to the brightness of the light produced by the light sources. Similarly, the sensor S2 can be an operable a device that is configured to be brought into various states to define specific setpoint positions for an arrangement of one or more blinds (e.g. device 5.2), which the one blind or the individual blinds should adopt. Similarly, the sensor Sm can be an operable device which is configured to be brought into different states in order to define different setpoint temperatures for a heating system (e.g. device 5.3) which are to be achieved in the room or the individual rooms to heat one or more rooms.

The bus-type data transmission device BD in the present example comprises a bus B1, which enables a wired transmission of data or a wired transmission of signals. In the present example, the processing unit R, all sensors S1-Sm and all actuators are connected to the bus B1, so that the processing unit R, all sensors S1-Sm and all actuators can be involved in a transfer of data or signals via the same bus B1.

Both the sensors S1-Sm and the actuators A1-An are configured to be controlled by the processing unit R, namely by means of control signals that can be generated by the processing unit R and can be transmitted over the bus-type data transmission device to the sensors S1-Sm or to the actuators A1-An. This last point will be explained in more detail below.

Figure 2:
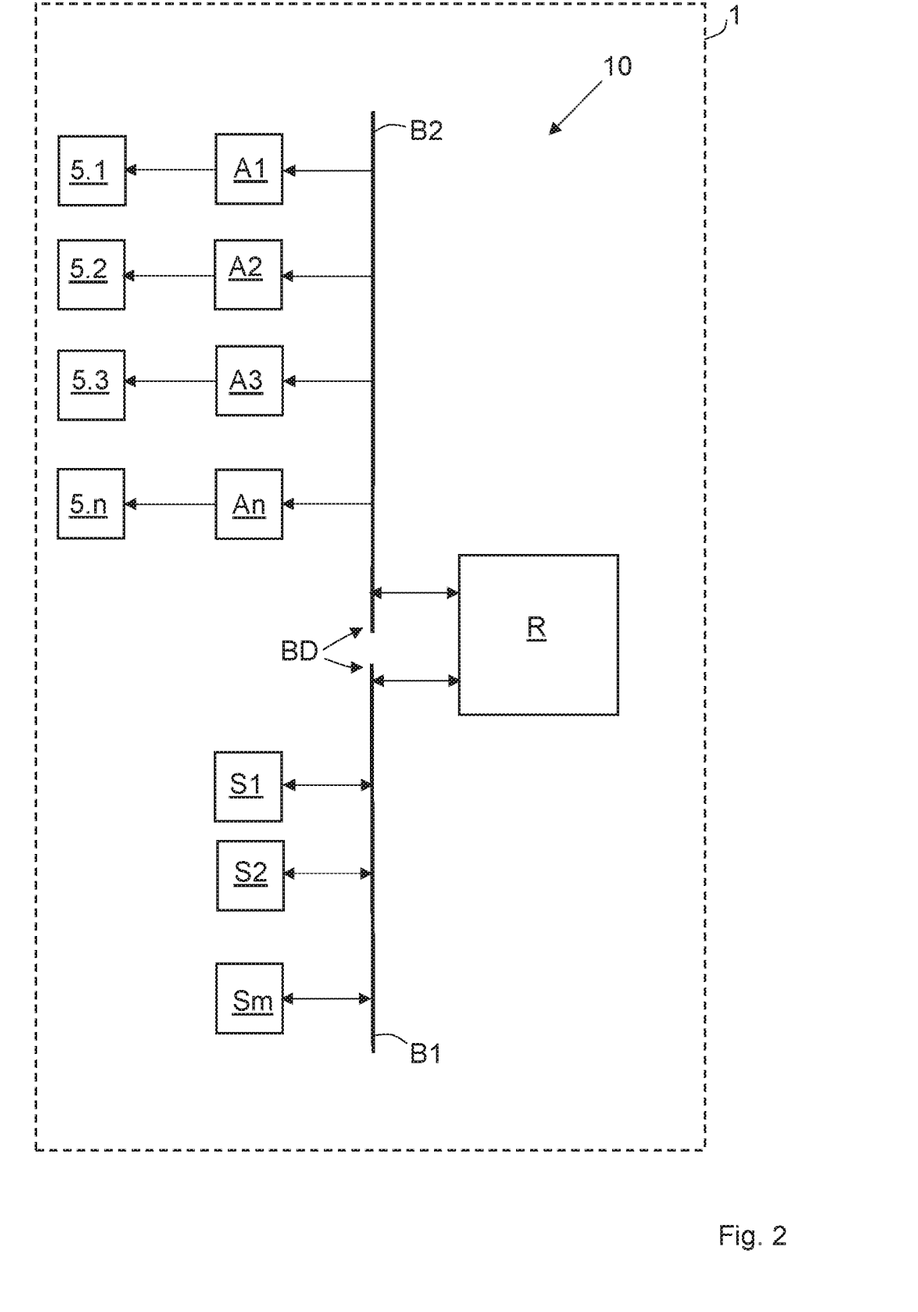
FIG. 2 a second embodiment of a system for home automation in accordance with the invention.

FIG. 2 shows a system 10 for automation of a home 1 in accordance with the invention in a second embodiment. In FIG. 1 and FIG. 2 identical or identically functioning details of the respective system 10 are each labelled with the same reference characters. Consequently, only the essential differences between the embodiments according to FIGS. 1 and 2 will be discussed.

The second embodiment of the system 10 according to FIG. 2 differs from the first embodiment in accordance with FIG. 1 by the fact that in the case of the system 10 according to FIG. 2, the bus-type data transmission device BD comprises a first bus B1 and a second bus B2 separate from the first bus B1, wherein the processing unit R is connected to each individual sensor S1-Sm via the first bus B1 and the processing unit R is connected to each actuator A1-An via the second bus B2. In the present example according to FIG. 2, the first bus B1 enables a wired transmission of data or a wired transfer of signals between the processing unit R and all sensors S1-Sm, but no transmission of data or signals between the processing unit R and the individual actuators A1-An. On the other hand, the second bus B2 enables a wired transmission of data or a wired transfer of signals between the processing unit R and all actuators A1-An, but no transmission of data or signals between the processing unit R and the individual sensors S1-Sm.

In the following, details of the first embodiment of the system 10 according to FIG. 1 and the second embodiment of the system 10 according to FIG. 2 are explained by referring to FIGS. 3 and 4.

Figure 3:
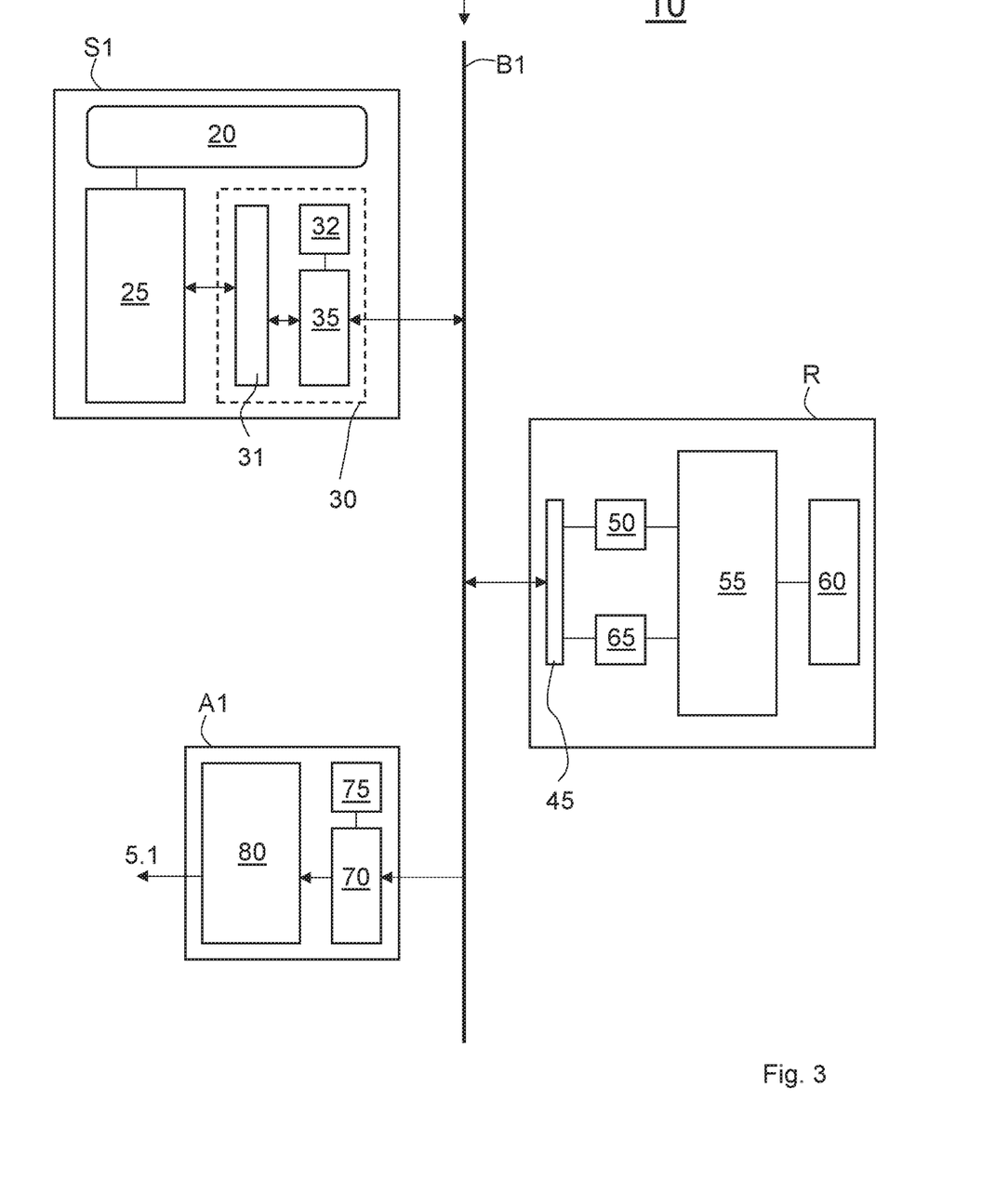
FIG. 3 a detailed representation of a sensor, an actuator and the processing unit of the first embodiment in accordance with FIG. 1.
Figure 4:
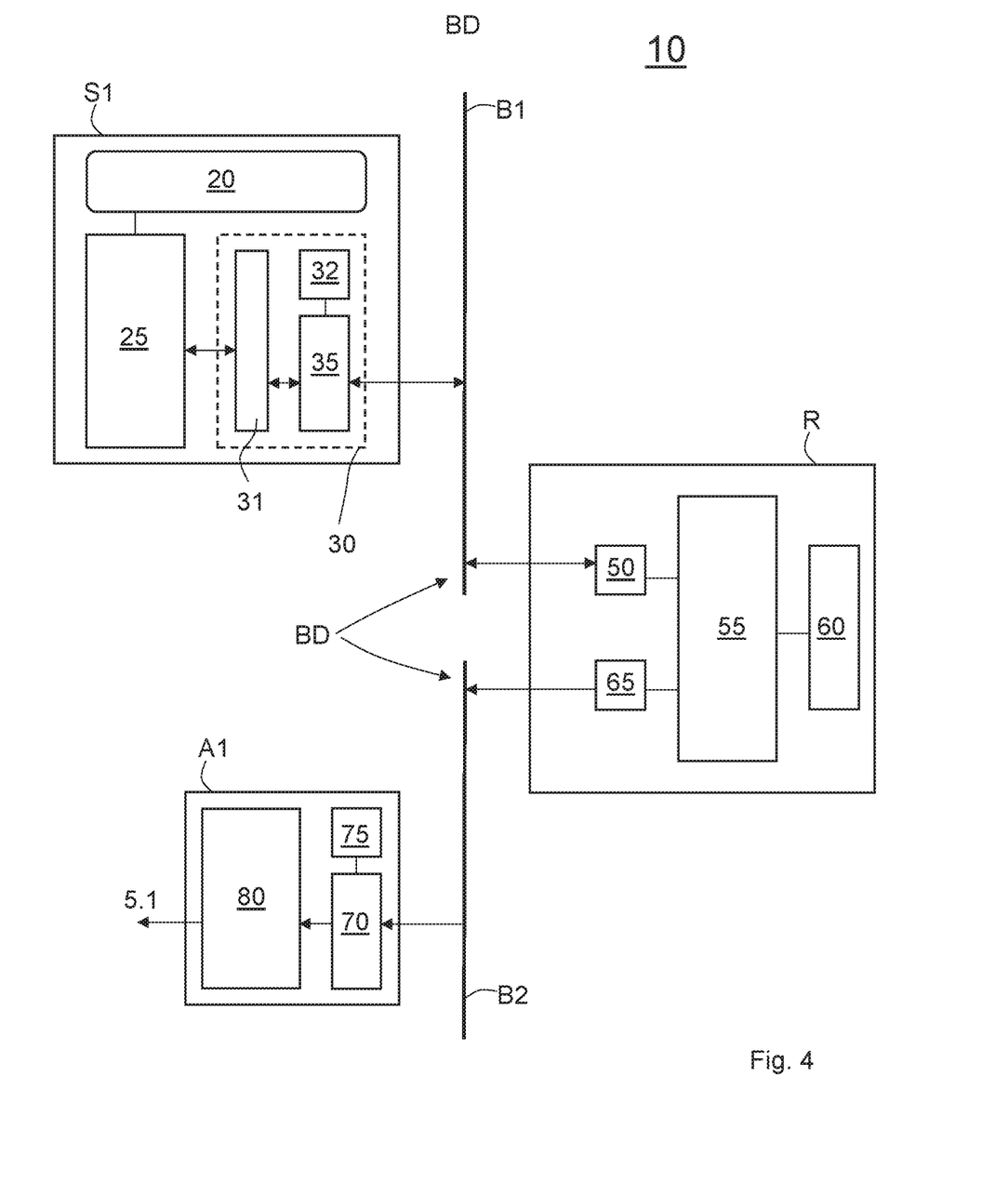
FIG. 4 a detailed representation of a sensor, an actuator and the processing unit of the second embodiment in accordance with FIG. 2.

FIGS. 3 and 4 show, in particular, details (as regards the structure and function) of the processing unit R, the sensors S1-Sm and the actuators A1-An. In the present case it can be assumed that the sensors S1-Sm are structurally and functionally designed in essentially the same way in relation to the operation of the system 10. Further, it can be assumed that the actuators A1-An are each structurally and functionally designed in essentially the same way in relation to the operation of the system 10.

Accordingly, in FIGS. 3 and 4 not all sensors S1-Sm are shown, but by way of example only the sensor S1, wherein essentially details of the sensor S1 are shown which the rest of the sensors also have in a similar form. In addition, in FIGS. 3 and 4 not all actuators A1-An are shown, but by way of example only the actuator A1, wherein essentially details of the actuator A1 are shown which the rest of the actuators also have in a similar form.

As is apparent from FIGS. 3 and 4, the sensor S1 has at least one sensor element 20, which is configured to be brought into different states (these different states of the sensor element 20 are treated in this context as "different states of the sensor S1"). The sensor element 20 can be, for example, a button or a touch-sensitive display, which can be operated manually in different ways to define different states.

The sensor S1 (like the rest of the sensors) also comprises a measuring device 25, which is designed to register a current state of the sensor element 20 (i.e. the state into which the sensor element 20 is brought at a particular time). The measuring device 25 is enabled to register the current state of the sensor S1, for example, continuously or quasi-continuously at a series of successive times.

The sensor S1 (like the other sensors) also has a memory 30 which is provided for storing data. For this purpose, the memory 30 has in particular a memory element 31, in which the respective data can be stored.

The memory element 31 is used in the operation of the sensor S1, in particular, to store information about the current state of the sensor S1 or the sensor element 20. For this purpose the sensor S1 (like the rest of the sensors) is designed in such a way that in the operation of the sensor S1, after each registration of a current state of the sensor element 20 by means of the measuring device 25, a sensor state information is stored in the memory element 31, which corresponds to the current state of the sensor element 20 registered by the measuring device 25. The measuring device 25 is configured to register the current state of the sensor S1, preferably continuously or quasi-continuously at a series of successive times. This means that the sensor status information stored in the memory element 31 is constantly updated, thus ensuring that the storage element 31 always contains up-to-date information about the current state of the sensor element 20 or the sensor S1.

Each of the sensors S1-Sm and, in particular, the memory 30 of each of the sensors S1-Sm can be controlled by the processing unit R, in particular by means of sensor control signals which can be generated by the processing unit R and can be transmitted over the bus-type data transmission device BD to the sensors S1-Sm. To this end, the memory 30 of each of the sensors S1-Sm has a bus coupling device 35, which is designed to receive a sensor control signal transmitted by means of the bus-type data transmission device BD and if appropriate, to initiate a control of the respective sensor or the memory 30 of the respective sensor.

In order to enable a selective activation of a particular sensor, each of the sensors S1-Sm is assigned an address information which uniquely identifies each sensor. In addition, each of the sensors S1-Sm comprises an address information storage element 32, which contains address information assigned to the sensor (FIGS. 3 and 4). The address information storage elements 32 of the individual sensors can be designed, for example, as conventional address switches which can be adjusted manually to specify desired address information. Known embodiments of such address switches are, for example, rotary switches or DIP switches. Alternatively, the address information storage element 32 can be designed as a non-volatile data memory, wherein this data memory stores the particular address information which is assigned to the respective sensor.

In order to enable a selective activation of a particular sensor, each of the sensors S1-Sm can be controlled by the processing unit R by means of a sensor control signal transmitted via the bus-type data transmission device BD, which contains the address information assigned to the respective sensor and control information for controlling the sensor.

In addition, the bus coupling device 35 of each of the sensors S1-Sm is designed to initiate a control of the respective sensor only when the address information contained in the received sensor control signal is identical to the address information which is assigned to the respective sensor, wherein the bus coupling device 35 is designed to initiate the control of the sensor according to the control information contained in the received sensor control signal. The control information contained in the sensor control signal therefore defines which response of the respective sensor should be initiated as a result of the sensor being activated with the sensor control signal. As FIGS. 3 and 4 also indicate, the bus coupling devices 35 of each of the sensors S1-Sm is connected to the memory 30 or the memory element 31 of the respective sensor, so that the memory 30 or the memory element 31 of the respective sensor is controllable depending on the received sensor control signal.

Each of the actuators A1-An is controllable by the processing unit R, specifically by means of actuator control signals which can be generated by processing unit R and transferred via the bus-type data transmission device BD to the actuators A1-An.

To this end, each of the actuators A1-An has a bus coupling device 70, which is designed to receive an actuator control signal transmitted by means of the bus-type data transmission device BD and if appropriate, to initiate a control of the respective actuator.

In order to enable a selective activation of a particular actuator, each of the actuators A1-An is assigned an address information which uniquely identifies each actuator. In addition, each of the actuators A1-An comprises an address information storage element 75, which contains the address information assigned to the actuator (FIGS. 3 and 4). The address information storage elements 75 of the individual actuators can be designed in the same way as the above-mentioned address information storage elements 32 of the sensors S1-Sm.

In order to enable a selective activation of a particular actuator, each of the actuators A1-An is configured to be controlled by the processing unit R by means of an actuator control signal transmitted via the bus-type data transmission device BD, which contains the address information assigned to the respective actuator and control information for controlling the actuator.

In addition, the bus coupling device 70 of each of the actuators A1-An is designed to initiate a control of the respective actuator only if the address information contained in the received actuator control signal is identical to the address information assigned to the respective actuator, wherein the bus coupling device 70 is designed to initiate the control of the actuator according to the control information contained in the received actuator control signal. The control information contained in the actuator control signal therefore defines which response of the respective actuator should be initiated as a result of the actuator being activated with the actuator control signal. As FIGS. 3 and 4 also indicate, the bus coupling device 70 of each of the actuators A1-An is connected to a control device 80 for controlling the household device associated with the respective actuator, so that the control device 80 of the respective actuator is controllable depending on the actuator control signal received.

As FIG. 3 suggests, the processing unit R of the first embodiment of the system 10 comprises the following functional components:
- memory access means 50 which enable access to the memories 30 of the sensors S1-Sm and are designed to generate sensor control signals for controlling the sensors S1-Sm;
- an evaluation device 55;
- a data memory 60;
- a control device 65, which is designed to generate actuator control signals for controlling the actuators A1-An;
- a bus coupling device 45.

In the case of the embodiment shown in FIG. 3 of the processing unit R, the function of the bus coupling device 45 is to coordinate the timing of the transmission of the sensor control signals generated by means of the memory access means 50 via the bus-type data transmission device BD and the transmission of the actuator control signals generated by means of the control device 65 via the bus-type data transmission device BD with each other, in order to ensure that sensor control signals and actuator control signals are not transmitted at the same time. Since the data transmission device BD in the present embodiment comprises only one bus B1, conflicts with regard to the transmission of the sensor control signals and the transmission of the sensor control signals via the same bus B1 can be avoided.

To enable a control of one of the sensors S1-Sm, the memory access means 50 are designed to generate a sensor control signal, which: (i) is transmitted by means of the bus-type data transmission device BD to each of the sensors S1-Sm; (ii) contains the address information assigned to the sensor to be controlled; (iii) additionally contains a control information. The information contained in the sensor control signal defines what effect the activation should have on the sensor.

The memory access means 50 are designed, in particular, to perform accesses to each memory 30 of the individual sensors S1-Sm via the bus-type data transmission device BD, so that the sensor state information items stored in the memory elements 31 of the sensors S1-Sm can be recorded by the processing unit R. To perform an access to the memory 30 of one of the sensors S1-Sm, the memory access means 50 transmit via the bus-type data transmission device BD a corresponding sensor control signal, which contains the address information of the sensor whose memory 30 should be accessed.

This sensor control signal can be used—as explained above—to activate exclusively the sensor that corresponds to the control information contained in the sensor control signal, to which the same address information is assigned as that contained in the sensor control signal. In the present case, the activation of the sensor whose memory 30 should be accessed has the effect that the memory 30 is controlled to provide a signal (preferably an electric signal), which contains an encoding of the sensor state information stored in the memory element 31 of the sensor. In addition, the memory access means 50 of the processing unit R are designed to detect (using a measurement device not shown in the figures) the signal provided by the memory 30 via the bus-type data transmission device BD and to determine the sensor status information from the encoding contained in the signal.

In the operation of the system 10 it is provided that at least one actuator, for example the actuator A1, should be able to be controlled depending on the current state of at least one sensor, for example, the sensor S1. For this purpose the system 10 is configured as follows.

First of all, the processing unit R controls the memory access means 50 to perform an access to the memory 30 of the sensor S1 via the bus-type data transmission device BD so that sensor state information stored in the memory 30 of the sensor S1 is recorded by the processing unit R.

In addition, the evaluation device 55 of the processing unit R is designed to carry out an evaluation of sensor state information recorded by the processing unit R, and as a result of the evaluation to determine according to predefined rules whether the at least one actuator A1 should be activated to control the household device 5.1, and, if the result of the evaluation is that the actuator A1 should be activated to control the household device 5.1, to cause the control device 65 to transmit a corresponding actuator control signal via the bus-type data transmission device BD to the actuator A1.

In addition, the memory access means 50 can be controlled to perform the access to the memory 30 of the sensor S1 repeatedly at consecutive times (for example, repeatedly at time intervals of 0.1 seconds) so that the processing unit R after each access of the memory access means 50 can record the particular sensor status information stored in the memory 30 of the sensor S1. The evaluation device 55 is also designed to carry out an evaluation of the sensor state information recorded by the processing unit R after each access of the memory access means 50, and as a result of the evaluation to determine according to predefined rules whether the actuator A1 should be activated to control the household device 5.1, and if the result of the evaluation is that the actuator A1 should be activated to control the household device 5.1, to cause the control device 65 to transmit a corresponding actuator control signal via the bus-type data transmission device BD to the at least one actuator A1.

In addition, the memory access means 50 can be controlled to perform repeated accesses to the memories 30 of all sensors S1-Sm consecutively, and therefore for each of the sensors S1-Sm to acquire the sensor state information of the respective sensor stored in the memory 30 after each access to the memory 30 of the respective sensor.

The system 10 can also be designed in such a way that each of the sensors S1-Sm is assigned at least one of the actuators A1-An and the processing unit R comprises an implementation of a sensor-actuator mapping, which for each of the sensors S1-Sm contains information about which of the actuators A1-An is assigned to the sensor. This implementation can be implemented, for example, by storing the information corresponding to the sensor-actuator mapping in the data memory 60 of the processing unit R. This means that information is available to the processing unit R at any time as to which of the actuators A1-An is assigned to a certain sensor. In this case, it is provided to control each actuator which is assigned to a specific sensor in accordance with the implementation of the sensor-actuator mapping, depending on the current state of the particular sensor.

For this purpose, the evaluation device 55 is designed, after accessing the memory 30 of the respective sensor or after recording sensor state information stored in the memory 30 of the respective sensor, to carry out an evaluation of the recorded sensor state information for each of the individual sensors S1-Sm, and as a result of the evaluation to determine according to predefined rules whether an actuator, which is assigned to the respective sensor according to the sensor-actuator mapping, should be activated to control at least one household device, and if the result of the evaluation is that an actuator which is assigned to the respective sensor according to the sensor-actuator mapping should be activated to control the at least one household device, to cause the control device 65 to transmit a corresponding actuator control signal via the bus-type data transmission device BD to the actuator which is assigned to the respective sensor according to the sensor-actuator mapping. If multiple actuators are assigned to one of the sensors, the measures given above can of course be carried out in the same way for each of the actuators which are assigned to the sensor, i.e. the control device 65 may be caused to transfer a corresponding actuator control signal to the respective actuators, which are assigned to the one of the sensors.

In the data memory 60 of the processing unit R different data can be stored, which serve to define a specific configuration of the system 10 which determines the operation of the system 10 following an initial installation of the system 10. These data include in particular:

the address information being assigned to the individual sensors;

the address information being assigned to the individual actuators;

information about the sensor-actuator mapping;

a specification of the predefined rules, according to which the evaluation device 55 evaluates the recorded sensor status information and determines whether a specific actuator should be activated.

It can also be provided that one or more sensors are configurable to enable an operation of the respective sensor in different configurations depending on predeterminable configuration data. The predeterminable configuration data each define a specific operating mode of the respective sensor, selected from a plurality of possible operating modes, in which the respective sensor could be operated during an operation of the system 10.

The system 10 is designed in such a way that after an initial installation of a sensor the system can automatically detect whether the sensor is configurable and still needs to be configured after the initial installation of the sensor. In this respect, the memory 30 of a sensor which is configurable can be designed in such a way that on its initial installation this memory contains characteristic data which indicate that the sensor is configurable and needs to be further configured after the initial installation of the sensor. Because the processing unit R is configured to carry out access to the memory of the sensor, in an initial access to the memory 30 of the sensor the processing unit can record the data contained in the memory 30 and therefore detect, based on the recorded data, whether the sensor is configurable and whether it must also be configured after the initial installation of the sensor.

In addition, the processing unit R is configured to initiate an initial configuration of a sensor after an initial installation of the sensor, by means of a sensor control signal transmitted via the bus-type data transmission device BD whose control information contains the specific configuration data which are intended for the initial configuration of the sensor. Advantageously the configuration data contained in the sensor control signal can be stored in the memory 30 of the sensor to be configured.

All of the specific configuration data which are intended for configuring the sensors can be advantageously stored in the data memory 60 of the processing unit R.

The data memory 60 of the processing unit R is advantageously used to store a series of data which are acquired during the operation of the system 10. These include: the sensor state data which are recorded by the processing unit R during operation; the control information which is contained in the actuator control signals transmitted to the actuators. Accordingly, the data memory contains information on the state into which the respective sensors and actuators are currently brought during the operation of the system 10.

The data memory 60 of the processing unit R is advantageously a non-volatile memory, so that all data stored in the data memory 60 is retained even if a malfunction of the power supply to the processing unit R or the system 10 should occur.

The processing unit R of the second embodiment of the system 10 according to FIG. 4 differs from the processing unit R of the first embodiment of the system 10 according to FIG. 3 only in the respect that the bus-coupling device 45 shown in FIG. 3 is not provided in the case of the processing unit R of the second embodiment in accordance with FIG. 4. This is due to the fact that the bus-type data transmission device BD in accordance with FIG. 4—as already mentioned—comprises the first bus B1 and the second bus B2, separate from the first bus. In the present case, the sensor control signals, which can be generated by means of the memory access means 50, are transferred via the first bus B1 to the sensors S1-Sm, while the actuator control signals, which can be generated by means of the control device 65, are transmitted via the second bus B2 to the actuators A1-An.

In FIGS. 3 and 4 the evaluation device 55 and the control device 65 are shown schematically as separate components of the processing unit R. The processing unit can of course also be designed in such a way that the above described functions of the evaluation device 55 and the control device 65 are implemented in a single module of the processing unit R. The evaluation device 55 can be, for example, an integral component of the control device 65.

The processing unit R can be designed as a conventional server, for example, as a Linux server. The first bus B1, for example, can be implemented on the basis of a Modbus protocol. The second bus B2, for example, can be implemented on the basis of a DMX protocol.

These measures allow the system 10 to be implemented on the basis of a bus-type data transmission device, which can be implemented with cost-effective electronics and enables a fast data transmission.

The invention claimed is:

1. A system (10) for home (1) automation, which comprises:
at least one actuator (A1, A2, A3) for controlling at least one household device (5.1, 5.2, 5.3);
a plurality of sensors, (S1, S2, Sm) wherein each sensor of the plurality of sensors is enabled to be brought into different states and each sensor of the plurality of sensors has a respective measuring device (25) for registering a current state of a respective sensor of the plurality of sensors (S1, S2, Sm) and a respective memory (30, 31), wherein the different states of each sensor of the plurality of sensors (S1, S2, Sm) comprise at least a first state and a second state and the respective memory (30, 31) of the respective sensor (S1, S2, Sm) is configured to store sensor state information following a registration of a current state of the respective sensor (S1) by means of the respective measuring device (25), which sensor state information corresponds to the current state of the respective sensor (S1, S2, Sm) registered by the respective measuring device (25);
a central processing unit (R) remote from each sensor of the plurality of sensors; and
a bus-type data transmission device (BD), via which the central processing unit (R) is connected to each sensor of the plurality of sensors (S1, S2, Sm) and the at least one actuator (A1, A2, A3), the bus-type data transmission device (BD) comprising at least one bus (B1), wherein the central processing unit (R) comprises a control device (65) designed to transmit an actuator control signal to the at least one actuator (A1, A2, A3) via the bus-type data transmission device (BD) for activating the at least one actuator (A1, A2, A3) to control the at least one household device (5.1);
wherein the central processing unit (R) comprises memory access means (50) designed to perform access to the respective memory (30, 31) of each sensor of the plurality of sensors (S1, S2, Sm) via the at least one bus (B1) so that sensor state information stored in the respective memory (30, 31) of each sensor of the plurality of sensors (S1, S2, Sm) is enabled to be recorded by the central processing unit (R);

wherein the control device (65) of the central processing unit (R) is designed to control the at least one actuator (A1, A2, A3) as a function of sensor state information recorded by the central processing unit (R), in such a way that the control device (65) transmits a first actuator control signal via the bus-type data transmission device (BD) to the at least one actuator (A1, A2, A3) if the sensor state information recorded by the central processing unit (R) corresponds to the first state of the respective sensor (S1, S2, Sm), and transmits either no actuator control signal or a second actuator control signal, different from the first actuator control signal, via the bus-type data transmission device (BD) to the at least one actuator (A1, A2, A3), if the sensor state information recorded by the central processing unit (R) corresponds to the second state of the respective sensor (S1, S2, Sm);

wherein the at least one household device and each sensor of the plurality of sensors are designed in accordance with one of the following alternatives (a)-(c):

(a) the at least one household device (5.1) is a lighting device and the respective sensor (S1) is designed as an operable switch, which is enabled to be brought into different states to switch at least one light source of the lighting device on or off or control it with regard to the brightness of the light generated by means of the light source;

(b) the at least one household device (5.2) is an arrangement of at least one blind and the respective sensor (S2) is designed as an operable device, which is enabled to be brought into different states which define setpoint positions of the at least one blind;

(c) the at least one household device (5.3) is a heating device for heating at least one room and the respective sensor (Sm) is designed as an operable device which is enabled to be brought into different states, which define setpoint temperatures to be achieved in the at least one room by means of the heating device;

wherein:

the central processing unit (R) is connected to each sensor of the plurality of sensors (S1, S2, Sm) via the at least one bus (B1), wherein the at least one bus (B1) is designed to enable a wired transmission of data or signals between the central processing unit (R) and each sensor of the plurality of sensors (S1, S2, Sm);

the memory access means (50) are configured to be controlled to carry out the access to the respective memory (30, 31) of each sensor of the plurality of sensors (S1, S2, Sm) via the at least one bus (B1) repeatedly at a plurality of consecutive times, the central processing unit (R) is designed to record, after each access of the memory access means (50) to the respective memory (30, 31) of the respective sensor (S1, S2, Sm), the sensor state information stored in the respective memory (30, 31) of the respective sensor (S1); and the control device (65) is designed to control, after each access of the memory access means (50) to the respective memory (30, 31) of the respective sensor (S1, S2, Sm), the at least one actuator (A1) as a function of the sensor state information recorded by the central processing unit (R).

2. The system (10) according to claim 1, wherein the central processing unit (R) comprises an evaluation device (55), which is designed to carry out an evaluation of sensor state information recorded by the central processing unit (R) and as a result of the evaluation to determine according to predefined rules whether the at least one actuator (A1) should be activated to control the at least one household device (5.1), and, if the result of the evaluation is that the at least one actuator should be activated to control the at least one household device, to cause the control device (65) to transmit a corresponding actuator control signal via the bus-type data transmission device (BD) to the at least one actuator (A1).

3. The system (10) according to claim 1, wherein the at least one actuator comprises a plurality of actuators (A1, A2, A3, An) and the central processing unit (R) is connected to each actuator of the plurality of actuators (A1, A2, A3, An) via the bus-type data transmission device (BD).

4. The system (10) according to claim 3, wherein each sensor of the plurality of sensors (S1, S2, Sm) is assigned at least one actuator of the plurality of actuators (A1, A2, A3, An) and the central processing unit (R) comprises an implementation of a sensor-actuator mapping, which for each sensor of the plurality of sensors (S1, S2, Sm) contains information about which actuator of the plurality of actuators (A1, A2, A3, An) is assigned to the respective sensor, and the control device (65) of the central processing unit (R) is designed to control at least one actuator (A1) of the plurality of actuators which is assigned to the respective sensor (S1, S2, Sm), as a function of sensor state information recorded by the central processing unit (R), in such a way that the control device (65) transmits a first actuator control signal via the bus-type data transmission device (BD) to the at least one actuator (A1) which is assigned to the respective sensor (S1, S2, Sm), if the sensor state information recorded by the central processing unit (R) corresponds to the first state of the respective sensor (S1, S2, Sm), and transmits either no actuator control signal or a second actuator control signal, different from the first actuator control signal, via the bus-type data transmission device (BD) to the at least one actuator (A1) if the sensor state information recorded by the central processing unit (R) corresponds to the second state of the respective sensor (S1, S2, Sm).

5. The system (10) according to claim 4, having an evaluation device (55), which is designed to carry out, after recording sensor state information stored in the respective memory (30, 31) of the respective sensor (S1, S2, Sm), an evaluation of the recorded sensor state information for each sensor of the plurality of sensors (S1, S2, Sm), and as a result of the evaluation to determine according to predefined rules whether the at least one actuator (A1, A2, A3, An), which is assigned to the respective sensor (S1, S2, Sm) according to the sensor-actuator mapping, should be activated to control at least one household device (5.1, 5.2, 5.3, 5.n) and if the result of the evaluation is that the at least one actuator (A1, A2, A3, An), which is assigned to the respective sensor according to the sensor-actuator mapping, should be activated to control the at least one household device (5.1, 5.2, 5.3, 5.n), to cause the control device (65) to transmit the actuator control signal via the bus-type data transmission device (BD) to the at least one actuator (A1, A2, A3, An) which is assigned to the respective sensor (S1, S2, Sm) according to the sensor-actuator mapping.

6. The system (10) according to claim 1, wherein the processing unit (R) comprises a data memory (60), in which sensor state information recorded by the central processing unit (R) is enabled to be stored.

7. The system (10) according to claim 1, wherein the bus-type data transmission device (BD) comprises a first bus (B1) and a second bus (B2) separate from the first bus, the central processing unit (R) is connected to each sensor of the plurality of sensors (S1, S2, Sm) via the first bus (B1) and the central processing unit (R) is connected to each individual actuator (A1, A2, A3, An) via the second bus (B2).

8. The system (10) according to claim 1, wherein each sensor of the plurality of sensors (S1, S2, Sm) is assigned an address information which uniquely identifies each sensor of the plurality of sensors, and each sensor of the plurality of sensors (S1, S2, Sm) comprises an address information memory element (32) which contains the address information associated with the respective sensor.

9. The system (10) according to claim 8, wherein the central processing unit (R) comprises a data memory (60), in which for each sensor of the plurality of sensors (S1, S2, Sm) address data are stored which contain the address information associated with the respective sensor.

10. The system (10) according to claim 8, wherein each sensor of the plurality of sensors (S1, S2, Sm) is configured to be controlled by the central processing unit (R) by means of a sensor control signal, which sensor control signal contains the address information associated with the respective sensor (S1, S2, Sm) and control information for controlling the respective sensor (S1, S2, Sm) and is enabled to be generated by means of the memory access means (50) of the central processing unit (R) and to be transmitted by means of the bus-type data transmission device (BD) to each sensor of the plurality of sensors (S1, S2, Sm), which is connected via the bus-type data transmission device (BD) to the central processing unit (R).

11. The system (10) according to claim 10, wherein each sensor of the plurality of sensors (S1, S2, Sm) has a bus coupling device (35), which is designed to receive a sensor control signal transmitted by means of the bus-type data transmission device (BD), and to cause the respective sensor (S1, S2, Sm) to be controlled, provided the address information contained in the received sensor control signal is identical to the address information which is associated with the respective sensor (S1, S2, Sm), the bus coupling device (35) being designed to cause the control of the respective sensor (S1, S2, Sm) in accordance with the control information contained in the received sensor control signal.

12. The system (10) according to claim 11, wherein the bus coupling device (35) of the respective sensor (S1, S2, Sm) is connected to the respective memory (30, 31) of the respective sensor and the respective memory of the respective sensor is configured to be controlled as a function of the received sensor control signal that is received.

13. The system (10) according to claim 12, wherein the respective memory (30, 31) of the respective sensor (S1, S2, Sm) is controllable as a function of the received sensor control signal to provide a signal which contains an encoding of the sensor state information stored in the respective memory (30, 31) of the respective sensor (S1, S2, Sm), and the memory access means (50) of the central processing unit (R) are designed to detect the signal provided by the memory via the bus-type data transmission device (BD) and to determine the sensor state information from the encoding contained in the signal.

14. The system (10) according to claim 10, wherein at least one sensor of the plurality of sensors (S1, S2, Sm) is designed to be configurable to enable an operation of the at least one sensor in different configurations according to predeterminable configuration data, a first configuration of the at least one sensor after an initial startup of the at least one sensor is enabled to be initiated by the central processing unit (R) using a sensor control signal transmitted via the bus-type data transmission device, the control information of which signal contains configuration data designated for the first configuration, and the configuration data contained in the sensor control signal is enabled to be stored in the respective memory (30, 31) of the at least one sensor (S1, S2, Sm).

15. The system (10) according to claim 14, wherein the predeterminable configuration data and/or the configuration data designated for the first configuration are stored in a data memory (60) of the central processing unit (R).

16. The system (10) according to claim 1, wherein at least one actuator control signal transmitted to at least one actuator (A1, A2, A3, An) contains control information for controlling the at least one actuator; and the central processing unit (R) comprises a data memory (60), in which the control information contained in the actuator control signal is enabled to be stored.

* * * * *